C. H. FOX.
CLUTCH DEVICE.
APPLICATION FILED JUNE 23, 1913.

1,145,888.

Patented July 13, 1915.

Witnesses.
Samuel S. Carr.
E. E. Lundin.

Charles H. Fox. Inventor,
By Robert S. Carr.
Attorney.

UNITED STATES PATENT OFFICE.

CHARLES H. FOX, OF CINCINNATI, OHIO.

CLUTCH DEVICE.

1,145,888.  Specification of Letters Patent.  Patented July 13, 1915.

Application filed June 23, 1913.  Serial No. 775,398.

*To all whom it may concern:*

Be it known that I, CHARLES H. Fox, a citizen of the United States, residing at Cincinnati, Ohio, have invented a new and useful Improvement in Clutch Devices, of which the following is a specification.

Figure 1:
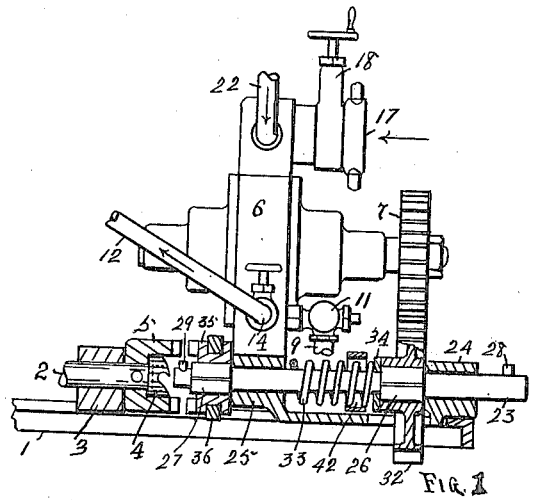

My invention relates to clutch devices adapted to the use of self propelled fire engines or for other suitable purposes, and the objects of my improvements are to provide a safety device in connection with the pump shaft for cranking the shaft of the explosive engine, and to provide simple and durable construction and assemblage of the various parts for securing facility of operation and efficiency of action. These objects may be attained in the following described manner, as illustrated in the accompanying drawings, in which:—
Figure 1 is a side elevation with parts broken away and part in vertical section on the axial line of the driving shaft of a self propelled fire engine embodying my improvements, and Fig. 2 a plan of the safety clutch connections between the driving and pump shafts.

In the drawings 1 represents the front portion of the vehicle frame which may be supported on ground wheels in the usual manner, 2 the driving shaft, which is preferably the crank shaft of the explosive engine, journaled in bearing 3 and provided with concentric clutch members 4 and 5 having oppositely disposed teeth. A gear pump 6 of the usual construction and supported on the frame is provided with the driving gear 7. The discharge tube 9 is provided with the usual safety valve 11, and a discharge hose 12 provided with the nozzle 13 may be connected with the valve controlled discharge opening 14. The opening 17 to the suction chamber is controlled by the gate valve 18 and adapted to connect with the usual supply, or suction, hose leading from a fire hydrant or cistern. Pipe 22 serves to connect the suction chamber of the pump with a source of supply (not shown).

Figure 2:
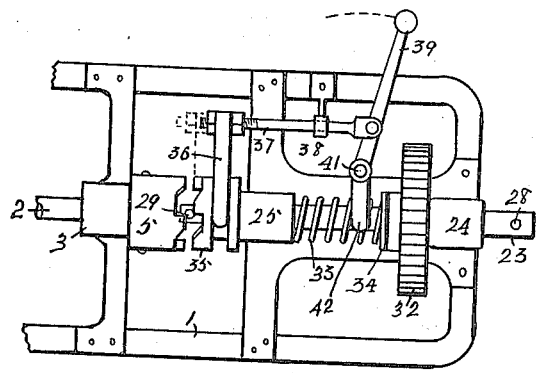

A storage tank 19 mounted in any convenient location on the vehicle and formed with an inlet opening which may be securely closed by the removable cover 21 communicates with the suction chamber of the pump through the valve controlled connections 22 therewith.
The pump driving shaft 23 journaled and also longitudinally movable in bearings 24 and 25 in alinement with the crank shaft is formed with rectangular portions 26 and 27, and provided with a cranking pin 28, and also with a clutch pin 29 adapted to detachably engage with the clutch member 4. The pinion 32 in continuous engagement with gear 7 is slidably mounted or splined on the portion 26 of shaft 23. A coiled spring 33 encircles shaft 23 between the collar 34 thereon and the fixed bearing 25 for automatically moving and maintaining, under a yielding pressure, said shaft longitudinally in a forward direction with the clutch pin 29 out of engagement with the clutch member 4 as shown in Figs. 2 and 3.

A clutch member 35 slidably mounted, or splined, on the portion 27 of shaft 23 and adapted to detachably engage with the clutch member 5 movably engages with the yoke arm 36 which is adjustably secured on rod 37. Said rod is slidably mounted in a fixed bearing 38 and a hand lever 39 pivotally connected thereto is fulcrumed at 41 and terminates in a yoke 42 which partially encircles the spring 33 adjacent to the collar 34. Said lever serves to move the rod and yoke arm with the clutch member 35 into engagement with the corresponding clutch member 5 for driving the pump.

For preventing the accidental engagement of the clutch members 35 and 5 during the cranking of the engine shaft in the usual manner, the rearward longitudinal movement of the pump shaft against the exertion of the spring engages the collar thereon with the adjacent yoke and actuates the hand lever and the rod with the yoke arm to move and positively maintain the clutch member 35 out of engagement during the engagement of the clutch pin with the clutch member 4, for turning the motor shaft by means of the usual crank being engaged with the cranking pin 28.

In operation, upon the arrival of the vehicle at a fire, the hand lever serves to clutch the pump into operative connection with the crank shaft for delivering the contents of the tank through the discharge hose and nozzle. After the connection of the main supply hose is made with the fire hydrant, and the gate valve is opened, the supply to the pump automatically changes from the tank to the supply hose. The delivery of water from the tank immediately upon arrival and during the time occupied in connecting the main hose is frequently sufficient to extinguish the fire in its beginning. Quick action in getting even a small amount of water on a fire is of the utmost importance. The high speed automobiles of fire chiefs may be equipped with such emergency apparatus to be utilized with signal advantage before the heavier and slower fire engines can arrive and get into action. When the hydrant pressure is strong or when chemicals are used in the tank to develop sufficient pressure, the discharge may be directed through the by-pass connections while the pump remains inactive.

What I claim as my invention is:—

1. The combination of two shafts, concentric clutch members on the adjacent ends thereof, and means for alternately engaging corresponding said members whereby either shaft may be rotated in the same direction by the other.

2. The combination of a motor shaft, concentric clutch members secured thereon, a cranking shaft arranged to engage with the interior of said members, a spring for moving and maintaining said shaft under a yielding pressure out of engagement with said clutch member, a clutch member splined on the cranking shaft and lever mechanism for engaging said member with the exterior corresponding clutch member on the motor shaft.

3. In a self propelled vehicle, the combination of a driving shaft, concentric clutch members secured thereon, a cranking shaft in alinement with said shaft and provided with corresponding clutch members, and selective means for engaging alternately the corresponding pair of said members.

4. In a self propelled vehicle, the combination of a motor shaft, concentric clutch members secured thereon having oppositely inclined teeth respectively, a cranking shaft movable longitudinally in alinement with said shaft and provided with a fixed and a movable clutch member, separate means for alternately engaging the latter members with the corresponding teeth of the former members and positive means for preventing the simultaneous engagement thereof.

CHAS. H. FOX.

Witnesses:
W. L. BARTH,
WALTER F. OBROCK.

Copies of this patent may be obtained for five cents each, by addressing the "Commissioner of Patents, Washington, D. C."